(12) United States Patent
Pope et al.

(10) Patent No.: US 8,737,431 B2
(45) Date of Patent: May 27, 2014

(54) CHECKING DATA INTEGRITY

(75) Inventors: Steve Leslie Pope, Cambridge (GB); Derek Edwards Roberts, Cambridge (GB); David James Riddoch, Cambridge (GB)

(73) Assignee: Solarflare Communications, Inc., Irvine, CA (US)

( * ) Notice: Subject to any disclaimer, the term of this patent is extended or adjusted under 35 U.S.C. 154(b) by 21 days.

(21) Appl. No.: 13/204,135

(22) Filed: Aug. 5, 2011

(65) Prior Publication Data

US 2011/0296535 A1 Dec. 1, 2011

Related U.S. Application Data

(63) Continuation of application No. 11/584,263, filed on Oct. 19, 2006, now abandoned.

(30) Foreign Application Priority Data

Apr. 21, 2004 (WO) ................ PCT/GB2005/001376

(51) Int. Cl.
*H04J 3/24* (2006.01)

(52) U.S. Cl.
USPC ......................................... 370/474; 370/242

(58) Field of Classification Search
USPC ................................................ 370/242, 474
See application file for complete search history.

(56) References Cited

U.S. PATENT DOCUMENTS

| | | | |
|---|---|---|---|
| 4,574,350 A | 3/1986 | Starr | |
| 5,272,599 A | 12/1993 | Koenen | |
| 5,325,532 A | 6/1994 | Crosswy et al. | |
| 5,448,739 A | 9/1995 | Jacobson | |
| 5,452,455 A | 9/1995 | Brown et al. | |
| 5,535,216 A | 7/1996 | Goldman et al. | |
| 5,535,416 A | 7/1996 | Feeney et al. | |

(Continued)

FOREIGN PATENT DOCUMENTS

| | | |
|---|---|---|
| EP | 0 598 210 | 5/1994 |
| EP | 620521 | 3/1995 |

(Continued)

OTHER PUBLICATIONS

Cramming more components onto integrated circuits, Electronics, vol. 38, No. 8, pp. 114-117, 1965, Gordon E. Moore, Apr. 19, 1965.

(Continued)

*Primary Examiner* — Jason Mattis

(74) *Attorney, Agent, or Firm* — Weide & Miller, Ltd.

(57) ABSTRACT

A network interface device for connection to a data processing device and to a data network so as to provide an interface between the data processing device and the network for supporting the network of packets of a transport protocol, the network interface device being configured to: identify within the payloads of such packets data of a further protocol, the data of the further protocol comprising payload data of the further protocol and framing data of the further protocol, and the framing data including verification data for permitting the integrity of the payload data to be verified; on so identifying data of the further protocol, process at least the payload data for determining the integrity thereof and transmit to the data processing device at least some of the framing data and an indication of the result of the said processing.

14 Claims, 5 Drawing Sheets

(56) References Cited

U.S. PATENT DOCUMENTS

| | | |
|---|---|---|
| 5,550,816 A | 8/1996 | Hardwick et al. |
| 5,603,020 A | 2/1997 | Hashimoto et al. |
| 5,634,124 A | 5/1997 | Khoyi et al. |
| 5,671,442 A | 9/1997 | Feeney et al. |
| 5,680,586 A | 10/1997 | Elkins et al. |
| 5,742,817 A | 4/1998 | Pinkoski |
| 5,946,189 A | 8/1999 | Koenen et al. |
| 6,021,446 A | 2/2000 | Gentry, Jr. |
| 6,070,219 A | 5/2000 | McAlpine et al. |
| 6,085,217 A | 7/2000 | Ault et al. |
| 6,098,112 A | 8/2000 | Ishijima et al. |
| 6,145,088 A | 11/2000 | Stevens |
| 6,160,554 A | 12/2000 | Krause |
| 6,170,018 B1 | 1/2001 | Voll et al. |
| 6,304,945 B1 | 10/2001 | Koenen |
| 6,349,035 B1 | 2/2002 | Koenen |
| 6,356,951 B1 | 3/2002 | Gentry, Jr. |
| 6,415,333 B1 | 7/2002 | Vasell |
| 6,424,621 B1 | 7/2002 | Ramaswamy et al. |
| 6,438,130 B1 | 8/2002 | Kagan et al. |
| 6,484,224 B1 | 11/2002 | Robins et al. |
| 6,502,203 B2 | 12/2002 | Barron et al. |
| 6,530,007 B2 | 3/2003 | Olarig et al. |
| 6,539,027 B1 | 3/2003 | Cambron |
| 6,560,613 B1 | 5/2003 | Gylfason et al. |
| 6,667,918 B2 | 12/2003 | Leader et al. |
| 6,675,200 B1 | 1/2004 | Cheriton et al. |
| 6,687,762 B1 | 2/2004 | Van Gaasbeck et al. |
| 6,687,849 B1 | 2/2004 | Cherf |
| 6,718,392 B1 | 4/2004 | Krause |
| 6,728,743 B2 | 4/2004 | Shachar |
| 6,732,211 B1 | 5/2004 | Goyal et al. |
| 6,735,642 B2 | 5/2004 | Kagan et al. |
| 6,744,652 B2 | 6/2004 | Srinivasan et al. |
| 6,751,701 B1 | 6/2004 | Pereira |
| 6,768,992 B1 | 7/2004 | Jolitz |
| 6,768,996 B1 | 7/2004 | Steffens et al. |
| 6,785,888 B1 | 8/2004 | McKenney et al. |
| 6,904,534 B2 | 6/2005 | Koenen |
| 6,950,961 B2 | 9/2005 | Krause et al. |
| 6,978,331 B1 | 12/2005 | Kagan et al. |
| 7,082,563 B2 | 7/2006 | Gemelli et al. |
| 7,093,158 B2 | 8/2006 | Barron et al. |
| 7,099,275 B2 | 8/2006 | Sarkinen et al. |
| 7,103,626 B1 | 9/2006 | Recio et al. |
| 7,103,744 B2 | 9/2006 | Garcia et al. |
| 7,136,397 B2 | 11/2006 | Sharma |
| 7,143,412 B2 | 11/2006 | Koenen |
| 7,149,227 B2 | 12/2006 | Stoler et al. |
| 7,151,744 B2 | 12/2006 | Sarkinen et al. |
| 7,216,225 B2 | 5/2007 | Haviv et al. |
| 7,236,740 B2 * | 6/2007 | Koo et al. ............... 455/13.4 |
| 7,240,350 B1 | 7/2007 | Eberhard et al. |
| 7,245,627 B2 | 7/2007 | Goldenberg et al. |
| 7,251,736 B2 | 7/2007 | Dayan et al. |
| 7,254,237 B1 | 8/2007 | Jacobson et al. |
| 7,285,996 B2 | 10/2007 | Fiedler |
| 7,299,266 B2 | 11/2007 | Boyd et al. |
| 7,313,667 B1 | 12/2007 | Pullela et al. |
| 7,316,017 B1 | 1/2008 | Jacobson et al. |
| 7,346,702 B2 | 3/2008 | Haviv |
| 7,356,818 B2 | 4/2008 | Carollo et al. |
| 7,386,619 B1 | 6/2008 | Jacobson et al. |
| 7,403,535 B2 | 7/2008 | Modi et al. |
| 7,404,190 B2 | 7/2008 | Krause et al. |
| 7,447,861 B2 | 11/2008 | Burka |
| 7,502,826 B2 | 3/2009 | Barron et al. |
| 7,509,355 B2 | 3/2009 | Hanes et al. |
| 7,518,164 B2 | 4/2009 | Smelloy et al. |
| 7,551,614 B2 | 6/2009 | Teisberg et al. |
| 7,554,993 B2 | 6/2009 | Modi et al. |
| 7,573,967 B2 | 8/2009 | Fiedler |
| 7,580,415 B2 | 8/2009 | Hudson et al. |
| 7,580,495 B2 | 8/2009 | Fiedler |
| 7,617,376 B2 | 11/2009 | Chadalapaka et al. |
| 7,631,106 B2 | 12/2009 | Goldenberg et al. |
| 7,650,386 B2 | 1/2010 | McMahan et al. |
| 7,688,853 B2 | 3/2010 | Santiago et al. |
| 7,757,232 B2 | 7/2010 | Hilland et al. |
| 7,801,027 B2 | 9/2010 | Kagan et al. |
| 7,802,071 B2 | 9/2010 | Oved |
| 7,813,460 B2 | 10/2010 | Fiedler |
| 7,827,442 B2 | 11/2010 | Sharma et al. |
| 7,835,375 B2 | 11/2010 | Sarkinen et al. |
| 7,835,380 B1 | 11/2010 | Aloni et al. |
| 7,848,322 B2 | 12/2010 | Oved |
| 7,856,488 B2 | 12/2010 | Cripe et al. |
| 7,864,787 B2 | 1/2011 | Oved |
| 7,904,576 B2 | 3/2011 | Krause et al. |
| 7,921,178 B2 | 4/2011 | Haviv |
| 7,929,539 B2 | 4/2011 | Kagan et al. |
| 7,934,959 B2 | 5/2011 | Rephaeli et al. |
| 7,978,606 B2 | 7/2011 | Buskirk et al. |
| 8,000,336 B2 | 8/2011 | Harel |
| 2002/0001302 A1 | 1/2002 | Picket |
| 2002/0032806 A1 | 3/2002 | Machin et al. |
| 2002/0059052 A1 | 5/2002 | Bloch et al. |
| 2002/0067722 A1 | 6/2002 | Kanakubo |
| 2002/0112139 A1 | 8/2002 | Krause et al. |
| 2002/0124108 A1 | 9/2002 | Terrell et al. |
| 2002/0129293 A1 | 9/2002 | Hutton et al. |
| 2002/0140985 A1 | 10/2002 | Hudson |
| 2002/0152226 A1 | 10/2002 | Burnett |
| 2002/0156784 A1 | 10/2002 | Hanes et al. |
| 2003/0007165 A1 | 1/2003 | Hudson |
| 2003/0051048 A1 | 3/2003 | Watson et al. |
| 2003/0058459 A1 | 3/2003 | Wu et al. |
| 2003/0063299 A1 | 4/2003 | Cowan et al. |
| 2003/0065856 A1 | 4/2003 | Kagan et al. |
| 2003/0081060 A1 | 5/2003 | Zeng et al. |
| 2003/0169738 A1 * | 9/2003 | McDaniel ............... 370/392 |
| 2003/0172330 A1 | 9/2003 | Barron et al. |
| 2003/0182465 A1 | 9/2003 | Moir et al. |
| 2003/0191786 A1 | 10/2003 | Matson et al. |
| 2003/0202043 A1 | 10/2003 | Zeng et al. |
| 2003/0214677 A1 | 11/2003 | Bhaskar et al. |
| 2003/0233514 A1 | 12/2003 | Honig |
| 2004/0010612 A1 | 1/2004 | Pandya |
| 2004/0037299 A1 | 2/2004 | Pandya |
| 2004/0054813 A1 | 3/2004 | Boucher et al. |
| 2004/0071250 A1 | 4/2004 | Bunton et al. |
| 2004/0141642 A1 | 7/2004 | Zeng et al. |
| 2004/0158793 A1 | 8/2004 | Blightman et al. |
| 2004/0190533 A1 | 9/2004 | Modi et al. |
| 2004/0190538 A1 | 9/2004 | Bunton et al. |
| 2004/0190557 A1 | 9/2004 | Barron |
| 2004/0193734 A1 | 9/2004 | Barron et al. |
| 2004/0193825 A1 | 9/2004 | Garcia et al. |
| 2004/0205441 A1 | 10/2004 | Oren |
| 2004/0210754 A1 | 10/2004 | Barron et al. |
| 2004/0210906 A1 | 10/2004 | Beresnevichiene et al. |
| 2004/0223462 A1 | 11/2004 | Cromer et al. |
| 2004/0252685 A1 | 12/2004 | Kagan et al. |
| 2004/0264384 A1 | 12/2004 | Deval et al. |
| 2005/0008223 A1 | 1/2005 | Zeng et al. |
| 2005/0018221 A1 | 1/2005 | Zeng et al. |
| 2005/0021558 A1 | 1/2005 | Beverly et al. |
| 2005/0038918 A1 | 2/2005 | Hilland et al. |
| 2005/0038941 A1 | 2/2005 | Chadalapaka et al. |
| 2005/0039171 A1 | 2/2005 | Avakian et al. |
| 2005/0039172 A1 | 2/2005 | Rees et al. |
| 2005/0039187 A1 | 2/2005 | Avakian et al. |
| 2005/0066333 A1 | 3/2005 | Krause et al. |
| 2005/0102682 A1 * | 5/2005 | Shah et al. ............... 719/321 |
| 2005/0114855 A1 | 5/2005 | Baumberger |
| 2005/0172181 A1 | 8/2005 | Huliehel |
| 2005/0219278 A1 | 10/2005 | Hudson |
| 2005/0219314 A1 | 10/2005 | Donovan et al. |
| 2005/0231751 A1 | 10/2005 | Wu et al. |
| 2005/0286519 A1 | 12/2005 | Ravikumar et al. |
| 2006/0015700 A1 | 1/2006 | Burka |
| 2006/0026443 A1 | 2/2006 | McMahan et al. |
| 2006/0045098 A1 | 3/2006 | Krause |
| 2006/0126619 A1 | 6/2006 | Teisberg et al. |

(56) References Cited

U.S. PATENT DOCUMENTS

| | | |
|---|---|---|
| 2006/0155801 A1 | 7/2006 | Brabson |
| 2006/0165074 A1 | 7/2006 | Modi et al. |
| 2006/0193318 A1 | 8/2006 | Narasimhan et al. |
| 2006/0228637 A1 | 10/2006 | Jackson et al. |
| 2006/0248191 A1 | 11/2006 | Hudson et al. |
| 2007/0110034 A1 | 5/2007 | Bennett |
| 2007/0118700 A1 | 5/2007 | Mensching et al. |
| 2007/0124545 A1 | 5/2007 | Blanchard et al. |
| 2007/0188351 A1 | 8/2007 | Brown et al. |
| 2007/0220183 A1 | 9/2007 | Kagan et al. |
| 2008/0024586 A1 | 1/2008 | Barron |
| 2008/0109526 A1 | 5/2008 | Subramanian et al. |
| 2008/0115216 A1 | 5/2008 | Barron et al. |
| 2008/0115217 A1 | 5/2008 | Barron et al. |
| 2008/0126509 A1 | 5/2008 | Subramanian et al. |
| 2008/0135774 A1 | 6/2008 | Hugers |
| 2008/0140618 A1 | 6/2008 | Kumar |
| 2008/0147828 A1 | 6/2008 | Enstone et al. |
| 2008/0148400 A1 | 6/2008 | Barron et al. |
| 2008/0177890 A1 | 7/2008 | Krause et al. |
| 2008/0244060 A1 | 10/2008 | Cripe et al. |
| 2008/0301406 A1 | 12/2008 | Jacobson et al. |
| 2008/0304519 A1 | 12/2008 | Koenen et al. |
| 2008/0310340 A1 | 12/2008 | Isozu |
| 2009/0116406 A1 | 5/2009 | Suzuki et al. |
| 2009/0165003 A1 | 6/2009 | Jacobson et al. |
| 2009/0201926 A1 | 8/2009 | Kagan et al. |
| 2009/0213856 A1 | 8/2009 | Paatela et al. |
| 2009/0268612 A1 | 10/2009 | Felderman et al. |
| 2009/0302923 A1 | 12/2009 | Smeloy et al. |
| 2010/0088437 A1 | 4/2010 | Zahavi |
| 2010/0138840 A1 | 6/2010 | Kagan et al. |
| 2010/0169880 A1 | 7/2010 | Haviv et al. |
| 2010/0174831 A9 * | 7/2010 | Elzur ............................ 709/250 |
| 2010/0188140 A1 | 7/2010 | Smelloy |
| 2010/0189206 A1 | 7/2010 | Kagan |
| 2010/0265849 A1 | 10/2010 | Harel |
| 2010/0274876 A1 | 10/2010 | Kagan et al. |
| 2011/0004457 A1 | 1/2011 | Haviv et al. |
| 2011/0010557 A1 | 1/2011 | Kagan et al. |
| 2011/0029669 A1 | 2/2011 | Chuang et al. |
| 2011/0029847 A1 | 2/2011 | Goldenberg et al. |
| 2011/0044344 A1 | 2/2011 | Hudson et al. |
| 2011/0058571 A1 | 3/2011 | Bloch et al. |
| 2011/0083064 A1 | 4/2011 | Kagan et al. |
| 2011/0096668 A1 | 4/2011 | Bloch et al. |
| 2011/0113083 A1 | 5/2011 | Shahar |
| 2011/0116512 A1 | 5/2011 | Crupnicoff et al. |
| 2011/0119673 A1 | 5/2011 | Bloch et al. |
| 2011/0173352 A1 | 7/2011 | Sela et al. |

FOREIGN PATENT DOCUMENTS

| | | |
|---|---|---|
| EP | 0 658 837 | 6/1995 |
| EP | 0 743 777 | 11/1996 |
| EP | 1 336 915 | 8/2003 |
| EP | 2272214 | 1/2011 |
| WO | WO 00/52869 | 9/2000 |
| WO | 0148972 | 7/2001 |
| WO | 0235838 | 5/2002 |
| WO | WO 03/104943 | 12/2003 |
| WO | WO 2004/017220 | 2/2004 |
| WO | 2008127672 | 12/2008 |
| WO | 2009136933 | 11/2009 |
| WO | 2010020907 | 7/2010 |
| WO | 2010087826 | 8/2010 |
| WO | 2011043768 | 4/2011 |
| WO | 2011053305 | 5/2011 |
| WO | 2011053330 | 5/2011 |

OTHER PUBLICATIONS

Programming Semantics for Multiprogrammed Computations, Communications of the ACM, vol. 9, No. 3, pp. 143-155, Jack B. Dennis and Earl C. Van Horn, Mar. 1966.

Proposal for an International End-to-End Protocol, ACM Computer Communication Review, vol. 6 No. 1, p. 1-18, V. Cerf, et al., Jan. 1976.

Ethernet: distributed packet switching for local computer networks, Communications of the ACM, vol. 19, Issue 7, pp. 395-404, Robert M. Metcalfe and David R. Boggs, Jul. 1976.

Interrupt Driven Programming, Communications of the ACM, vol. 14, No. 6, p. 417-418, Marvin Zelkowits, Jun. 1970.

Synchronizing Processors with Memory-Content-Generated Interrupts, Communications of the ACM, vol. 16, No. 6, p. 350-351, J. Carver Hill, Jun. 1973.

Virtual cut-through: A new computer communication switching technique, Computer Networks, vol. 3, No. 4, pp. 267-286, P. Kermani and L. Kleinrock, Sep. 1979.

An Overview of the New Routing Algorithm for the ARPANET, Proceedings of the 6th Data Communications Symposium, p. 63, John M. McQuillan, et al., Nov. 1979.

Grapevine: An Exercise in Distributed Computing, Communications of the ACM, vol. 25, Issue 4, pp. 260-274, Andrew D. Birrell, et al., Apr. 1982.

The Architecture of the Universe Network, ACM Computer Communication Review, vol. 14, No. 2, pp. 2-9, Ian M. Leslie, et al., Jun. 1984.

Congestion Control in IP/TCP Internetworks, ACM Computer Communication Review, vol. 14, No. 4, p. 11-17, John Nagle, Oct. 1984.

Development of a TCP/IP for the IBM/370, ACM Computer Communication Review, vol. 15, No. 4, Robert M. Brandriff, et al., Sep. 1985.

Supercomputers on the Internet: A Case Study, ACM Computer Communication Review, vol. 17, No. 5, C. Kline, Aug. 1987.

Fragmentation Considered Harmful, ACM Computer Communication Review, vol. 17, No. 5, pp. 390-401, Christopher A. Kent, Jeffrey C. Mogul, Oct. 1987.

An Analysis of Memnet: An Experiment in High-Speed Shared-Memory Local Networking, ACM Computer Communication Review, vol. 18, No. 4, p. 165-174, Gary S. Delp, et al., Aug. 1988.

Measured Capacity of an Ethernet: Myths and Reality, ACM Computer Communication Review, vol. 18, No. 4, p. 222-234, David R. Boggs, et al., Aug. 1988.

The VMP Network Adapter Board (NAB): High-Performance Network Communication for Multiprocessors, ACM Computer Communication Review, vol. 18, No. 4, p. 175-187, H. Kanakia and D. Cheriton, Aug. 1988.

Congestion Avoidance and Control, ACM Computer Communication Review, vol. 18, No. 4, p. 314-329, V. Jacobson, Aug. 1988.

The Design Philosophy of the DARPA Internet Protocols, ACM Computer Communication Review, vol. 18, No. 4, pp. 106-114, David D. Clark, Aug. 1988.

Development of the Domain Name System, ACM Computer Communication Review, vol. 18, No. 4, pp. 123-133, Paul V. Mockapetris and Kevin J. Dunlap, Aug. 1988.

Performance Comparison of the Cray-2 and Cray X-MP/416 Supercomputers, Proceedings of the 1988 ACM/IEEE conference on Supercomputing, p. 288-295, Orlando, Florida, Margaret L. Simmons and Harvey J. Wasserman, Nov. 12, 1988.

Implementing TCP/IP on a Cray computer, ACM Computer Communication Review, vol. 19, No. 2, p. 11-15, David A. Borman, Apr. 1989.

Computing the Internet Checksum, ACM Computer Communication Review, vol. 19, No. 2, p. 86-94, R. Braden, et al., Apr. 1989.

An Analysis of TCP Processing Overhead, IEEE Communications Magazine, vol. 27, No. 6, pp. 23-29, David D. Clark, et al., Jun. 1989.

Sirpent: A High-Performance Internetworking Approach, ACM Computer Communication Review, vol. 19, No. 4, p. 158-169, David R. Cheriton, Sep. 1989.

Protocol Design for High Speed Networks, PhD Thesis, University of Cambridge, Derek Robert McAuley, Sep. 1989.

How Slow Is One Gigabit Per Second?, ACM Computer Communication Review, vol. 20, No. 1, p. 44-53, Craig Partridge, Jan. 1990.

Architectural Considerations for a New Generation of Protocols, ACM Computer Communication Review, vol. 20, No. 4, pp. 200-208, D. D. Clark and D. L. Tennenhouse, Sep. 1990.

(56) References Cited

OTHER PUBLICATIONS

Protocol Implementation on the Nectar Communication Processor, ACM Computer Communication Review, vol. 20, No. 4, p. 135-144, Eric C. Cooper, et al., Sep. 1990.
A Host-Network Interface Architecture for ATM, ACM Computer Communication Review, vol. 21, No. 4, Bruce S. Davie, Sep. 1991.
A High-Performance Host Interface for ATM Networks, ACM Computer Communication Review, vol. 21, No. 4, p. 317-325, C. Brendan S. Traw, Sep. 1991.
Fairisle: An ATM Network for the Local Area, ACM Computer Communication Review, vol. 21, No. 4, p. 327, Ian Leslie and Derek R. McAuley, Sep. 1991.
The Desk Area Network, ACM Operating Systems Review, vol. 25, Issue 4, p. 14-21, Mark Hayter and Derek McAuley, Oct. 1991.
An Integration of Network Communication with Workstation Architecture, ACM Computer Communication Review, vol. 21, No. 5, p. 18-29, 1991.
The Evolution of XTP, Proceedings of the Third International Conference on High Speed Networking,. Greg Chesson. Nov. 1991.
System support for multi-service traffic, University of Cambridge Computer Laboratory Technical Report No. 245, Michael J. Dixon, Jan. 1992.
ATOMIC: A Local Communication Network Created Through Repeated Application of Multicomputing Components, Made available by authors, Danny Cohen, Gregory Finn, Robert Felderman, Annette DeSchon, Jan. 10, 1992.
Message Authentication with One-Way Hash Functions, ACM Computer Communication Review, vol. 22, No. 5, pp. 29-38, Gene Tsudik, Oct. 1992.
Analyzing Communication Latency using the Nectar Communication Processor, ACM Computer Communication Review, vol. 22, No. 4, Peter Steenkiste, Oct. 1992.
Efficient Demultiplexing of Incoming TCP Packets, ACM Computer Communication Review, vol. 22, No. 4, Paul E. McKenney and Ken F. Dove, Oct. 1992.
TCP/IP on the Parallel Protocol Engine, Proceedings of the IFIP TC6/WG6.4 Fourth International Conference on High Performance Networking IV, Erich Ruetsche and Matthias Kaiserswerth, Dec. 14, 1992.
Hardware/Software organization of a high performance ATM host interface, IEEE Journal on Selected Areas in Communications, pp. 240-253, C. Traw and J. Smith, Feb. 1993.
The Architecture of Gb/s Multimedia Protocol Adapter, ACM Computer Communication Review, vol. 23, No. 3, E. Ruetsche, Jul. 1993.
Giving Applications Access to Gb/s Networking, IEEE Network, vol. 7, Issue 4, pp. 44-52, Jonathan M. Smith and C. Brendan S. Traw, Jul. 1993.
The Design and Evaluation of an Off-Host Communications Protocol Architecture, MSci Thesis, University of Virginia, Jeffrey R. Michel, Aug. 1993.
A Workstation Architecture to Support Multimedia, PhD Thesis, University of Cambridge, Mark David Hayter, Sep. 1993.
The Importance of Non-Data Touching Processing Overheads in TCP/IP, ACM Computer Communication Review, vol. 23, No. 4, pp. 259-268, Jonathan Kay and Joseph Pasquale, Oct. 1993.
On the Self-Similar Nature of Ethernet Traffic, ACM Computer Communication Review, vol. 23, No. 4, p. 85-95, W. E. Leland, et al., Oct. 1993.
Implementing Network Protocols at User Level, ACM Computer Communication Review, vol. 23, No. 4, C. A. Thekkath, et al., Oct. 1993.
A Programmable HIPPI Interface for a Graphics Supercomputer, Proceedings of the 1993 ACM/IEEE conference on Supercomputing, p. 452-461, Portland, Oregon, Raj K. Singh, et al., Nov. 15, 1993.
Fbufs: A High-Bandwidth Cross-Domain Transfer Facility, ACM Operating Systems Review, vol. 27, Issue 5, p. 189-202, Peter Druschel and Larry L. Peterson, Dec. 1993.
The Parallel Protocol Engine, IEEE/ACM Transactions on Networking, vol. 1, No. 6, p. 650-663, Matthias Kaiserswerth, Dec. 1993.
Protocol Service Decomposition for High-Performance Networking, ACM Operating Systems Review, vol. 27, Issue 5, p. 244-255, Chris Maeda, Brian Bershad, Dec. 1993.
ETA: Experience with an Intel Xeon Processor as a Packet Processing Engine, IEEE Micro, vol. 24, No. 1, p. 24-31, Greg Regnier, et al., Jan. 1994.
A Simple LAN Performance Measure, ACM Computer Communication Review, vol. 24, No. 1, pp. 7-11, J. Vis, Jan. 1994.
ATOMIC: A High-Speed Local Communication Architecture, Journal of High Speed Networks, Danny Cohen, Gregory Finn, Robert Felderman, and Annette DeSchon, Jan. 3, 1994.
Netstation Architecture Multi-Gigabit Workstation Network Fabric, Proceedings of InterOp '94, Las Vegas, Nevada, Gregory G. Finn and Paul Mockapetris, May 1994.
The Medusa Applications Environment, Proceedings of the International Conference on Multimedia Computing and Systems, p. 265-273, Boston, Stuart Wray, et al., May 1994.
MPI: A Message-Passing Interface Standard, Message-Passing Interface Forum, University of Tennessee, Knoxville, Various forum members, May 5, 1994.
A Programmable Network Interface for a Message-Based Multicomputer, ACM Computer Communication Review, vol. 24, No. 3, p. 8-17, Raj K. Singh, et al., Jul. 1994.
Experiences with a High-Speed Network Adaptor: A Software Perspective, ACM Computer Communication Review, vol. 24, No. 4, P. Druschel, et al., Oct. 1994.
TCP and Explicit Congestion Notification, ACM, ACM Computer Communication Review, vol. 24, No. 5, p. 8-23, Sally Floyd, Oct. 1994.
User-Space Protocols Deliver High Performance to Applications on a Low-Cost Gb/s LAN, ACM Computer Communication Review, vol. 24, No. 4, pp. 14-23, A. Edwards, et al., Oct. 1994.
TCP Vegas: New Techniques for Congestion Detection and Avoidance, ACM Computer Communication Review, vol. 24, No. 4, p. 24-35, L. S. Brakmo, et al., Oct. 1994.
The Dynamics of TCP Traffic over ATM Networks, ACM Computer Communication Review, vol. 24, No. 4, p. 79-88, A. Romanow and S. Floyd, Oct. 1994.
Experiences of Building an ATM Switch for the Local Area, ACM Computer Communication Review, vol. 24, No. 4, p. 158-167, R. J. Black, I. Leslie, and D. McAuley, Oct. 1994.
Application-Specific Protocols for User-Level Shared Memory, Proceedings of the 1994 conference on Supercomputing, pp. 380-389, Washington D.C., Babak Falsafi, et al., Nov. 14, 1994.
Performance of High-Speed Network I/O Subsystems: Case Study of a Fibre Channel Network, Proceedings of the 1994 conference on Supercomputing, Washington D.C., Mengjou Lin, et al., Nov. 14, 1994.
Myrinet: A Gigabit-per-Second Local-Area Network, Draft of paper published in IEEE Micro, vol. 15, No. 1, pp. 29-36, Nanette J. Boden, et al., Nov. 16, 1994.
Beowolf: A Parallel Workstation for Scientific Computation, Proceedings of the 24th International Conference on Parallel Processing, pp. 11-14, Thomas Sterling, et al., Aug. 1995.
Software Support for Outboard Buffering and Checksumming, ACM Computer Communication Review, vol. 25, No. 4, p. 87-98, K. Kleinpaste, P. Steenkiste, B. Zill,, Oct. 1995.
Performance of Checksums and CRCS over Real Data, ACM Computer Communication Review, vol. 25, No. 4, p. 68-76, C. Partridge, J. Hughes, and J. Stone, Oct. 1995.
Experiences Implementing a High-Performance TCP in User-Space, ACM Computer Communication Review, vol. 25, No. 4, A. Edward and S. Muir, Oct. 1995.
The Case for Persistent-Connection HTTP, ACM Computer Communication Review, vol. 25, No. 4, J. C. Mogul, Oct. 1995.
U-Net: A User-Level Network Interface for Parallel and Distributed Computing, ACM Operating Systems Review, vol. 29, Issue 5, p. 109-126, Thorsten von Eicken, et al., Dec. 1995.
Towards an Active Network Architecture, ACM Computer Communication Review, vol. 26, No. 2, pp. 15-20, D. L. Tennenhouse, and D. J. Wetherall, Apr. 1996.
Devices in a Multi-Service Operating System, PhD Thesis, University of Cambridge, Paul Ronald Barham, Jul. 1996.

(56) References Cited

OTHER PUBLICATIONS

Low-Latency Communication on the IBM RISC System/6000 SP, Gigabit Networking Workshop '97 Meeting, Kobe, Japan, Chi-Chao Chang, et al., Nov. 17, 1996.
Experiences with a Production Gigabit LAN, Gigabit Networking Workshop '97 Meeting, Kobe, Japan, Joe Touch, et al., Apr. 1997.
Host-based Routing Using Peer DMA, Gigabit Networking Workshop '97 Meeting, Kobe, Japan, Joe Touch, et al., Apr. 1997.
Report on the 5th IFIP Internation Workshop on Quality of Service (IWQOS 97), ACM Computer Communication Review, vol. 27, No. 3, pp. 100-117, O. Angin, et al., Jul. 1997.
Firefly: a Multiprocessor Workstation, ACM Operating Systems Review, vol. 21, Issue 4, p. 164-172, Charles P. Thacker and Lawrence C. Stewart, Oct. 1997.
Performance of the CRAY T3E Multiprocessor, Proceedings of the 1997 ACM/IEEE conference on Supercomputing, p. 1-17, San Jose, California, Ed Anderson, et al., Nov. 16, 1997.
Performance Evaluation of the SGI Origin2000: A Memory-Centric Characterization of LANL ASCI Applications, Proceedings of the 1997 ACM/IEEE conference on Supercomputing, p. 1-11, San Jose, California, Harvey J. Wassermann, et al., Nov. 16, 1997.
An Implementation and Analysis of the Virtual Interface Architecture, Proceedings of the 1998 ACM/IEEE conference on Supercomputing, p. 1-15, Orlando, Florida, Philip Buonadonna, et al., Nov. 7, 1998.
MPI-StarT: Delivering Network Performance to Numerical Applications, Proceedings of the 1998 ACM/IEEE conference on Supercomputing, p. 1-15, Orlando, Florida, Parry Husbands and James C. Hoe, Nov. 7, 1998.
Avalon: An Alpha/Linux Cluster Achieves 10 Gflops for $150k, Proceedings of the 1998 ACM/IEEE conference on Supercomputing, Orlando, Florida, Michael S. Warren, et al., Nov. 7, 1998.
Scaling of Beowulf-class Distributed Systems, Proceedings of the 1998 ACM/IEEE conference on Supercomputing, Orlando, Florida, John Salmon, et al., Nov. 7, 1998.
StarT-Voyager: A Flexible Platform for Exploring Scalable SMP Issues, Proceedings of the 1998 ACM/IEEE conference on Supercomputing, Orlando, Florida, Boon S. Ang, et al., Nov. 7, 1998.
Enhancing Distributed Systems with Low-Latency Networking, Parallel and Distributed Computing and Networks, Brisbane, Australia, S. L. Pope, et al., Dec. 1998.
Internet Vulnerabilities Related to TCP/IP and T/TCP, ACM Computer Communication Review, vol. 29, No. 1, pp. 81-85, M. de Vivo, et al., Jan. 1999.
TCP Byte Counting Refinements, ACM Computer Communication Review, vol. 29, No. 3, M. Allman, Jul. 1999.
Piglet: A Low-Intrusion Vertical Operating System, Technical Report MS-CIS-00-04, University of Pennsylvania, Steve Muir and Jonathan Smith, Jan. 2000.
Characterizing Processor Architectures for Programmable Network Interfaces, Proceedings of the 14th international conference on Supercomputing, pp. 54-65, Santa Fe, New Mexico, Patrick Crowley, et al., May 8, 2000.
When The CRC and TCP Checksum Disagree, ACM Computer Communication Review, vol. 30, No. 4, pp. 309-319, Jonathan Stone and Craig Partridge, Oct. 2000.
The Failure of TCP in High-Performance Computational Grids, Proceedings of the 2000 ACM/IEEE conference on Supercomputing, Dallas, Texas, W. Feng and P. Tinnakornsrisuphap, Nov. 4, 2000.
Architectural and Performance Evaluation of GigaNet and Myrinet Interconnects on Clusters of Small-Scale SMP Servers, Proceedings of the 2000 ACM/IEEE conference on Supercomputing, Dallas, Texas, Jenwei Hsieh, et al., Nov. 4, 2000.
Arsenic: A User-Accessible Gigabit Ethernet Interface, Proceedings of IEEE Infocom 2001, pp. 67-76, Ian Pratt and Keir Fraser, Apr. 22, 2001.
Deferred Segmentation for Wire-Speed Transmission of Large TCP Frames over Standard GbE Networks, Proceedings of the 9th Symposium on High Performance Interconnects, pp. 81, Bilic Hrvoye, et al., Aug. 22, 2001.

Presentation given at HOTI'01, 9th Symposium on High Performance Interconnects, Bilic Hrvoye, et al., Aug. 22, 2001.
Topology Discovery for Large Ethernet Networks, ACM Computer Communication Review, vol. 31, No. 4, Bruce Lowekamp, et al., Oct. 2001.
EMP: Zero-copy OS-bypass NIC-driven Gigabit Ethernet Message Passing, Proceedings of the 2001 ACM/IEEE conference on Supercomputing, pp. 57, Denver, Piyush Shivam, et al., Nov. 10, 2001.
A Case Study in Application I/O on Linux Clusters, Proceedings of the 2001 ACM/IEEE conference on Supercomputing, pp. 11, Denver, Robert Ross, et al., Nov. 10, 2001.
On Making TCP More Robust to Packet Reordering, ACM Computer Communication Review, vol. 32, No. 1, E. Blanton and M. Allman, Jan. 2002.
TCP Servers: Offloading TCP Processing in Internet Servers. Design, Implementation, and Performance, Technical Report DCR-TR-481, Computer Science Department, Rutgers University, Murali Rangarajan, et al., Mar. 2002.
ATM: A Retrospective on Systems Legacy, ACM Computer Communication Review, vol. 32, No. 5, Jon Crowcroft and Derek McAuley, Nov. 2002.
A Retrospective View of ATM, ACM Computer Communication Review, vol. 32, No. 5, pp. 13-19, Charles Kalmanek, Nov. 2002.
The Influence of ATM on Operating Systems, ACM Computer Communication Review, vol. 32, No. 5, pp. 29-37, Jonathan Smith, Nov. 2002.
An Overview of the BlueGene/L Supercomputer, Proceedings of the 2002 ACM/IEEE conference on Supercomputing, pp. 1-22, Baltimore, NR Adiga, et al., Nov. 16, 2002.
Ultra-High Performance Communication with MPI and the Sun Fire Link Interconnect, Proceedings of the 2002 ACM/IEEE conference on Supercomputing, p. 1-15, Baltimore, Steven J. Sistare and Christopher J. Jackson, Nov. 16, 2002.
Some Internet Architectural Guidelines and Philosophy, IETF Network Working Group, Request for Comments: 3439, R. Bush, D. Meyer, Dec. 2002.
F-RTO: An Enhanced Recovery Algorithm for TCP Retransmission Timeouts, ACM Computer Communication Review, vol. 33, No. 2, Pasi Sarolahti, et al., Apr. 2003.
Scalable TCP: Improving Performance in Highspeed Wide Area Networks, ACM Computer Communication Review, vol. 33, No. 2, pp. 83-91, Tom Kelly, Apr. 2003.
TCP offload is a dumb idea whose time has come, Proceedings of HotOS IX: The 9th Workshop on Hot Topics in Operating Systems, pp. 25-30, Jeffrey C. Mogul, May 18, 2003.
A case for Virtual Channel Processors, Proceedings of the ACM SIGCOMM 2003 Workshops, Derek McAuley and Rolf Neugebauer, Aug. 2003.
Initial End-to-End Performance Evaluation of 10-Gigabit Ethernet, Proceedings of the 11th Symposium on High Performance Interconnects, Justin Hurwitz and Wu-chun Feng, Aug. 20, 2003.
Workshop on network-I/O convergence: experience, lessons, implications (NICELI), ACM Computer Communication Review, vol. 33, No. 5, Vinay Aggarwal, et al., Oct. 2003.
Optimizing 10-Gigabit Ethernet for Networks of Workstations, Clusters, and Grids: A Case Study, Proceedings of the 2003 ACM/IEEE conference on Supercomputing, Phoenix, Arizona, Wu-chun Feng, et al., Nov. 15, 2003.
Performance Comparison of MPI Implementations over InfiniBand, Myrinet and Quadrics, Proceedings of the 2003 ACM/IEEE conference on Supercomputing, Phoenix, Arizona, Jiuxing Liu, et al., Nov. 15, 2003.
Architectural Characterization of TCP/IP Packet Processing on the Pentium M Processor, Proceedings of the 10th International Symposium on High Performance Computer Architecture, pp. 152, Srihari Makineni and Ravi Iyer, Feb. 14, 2004.
Fast TCP: Motivation, Architecture, Algorithms, Performance, Proceedings of IEEE Infocom, pp. 1246-1259, Cheng Jin, et al., Mar. 7, 2004.
TCP Offload to the Rescue, ACM Queue, vol. 2, No. 3, Andy Currid, May 1, 2004.

(56) References Cited

OTHER PUBLICATIONS

TCP Onloading for Data Center Servers, Computer, IEEE Computer Society, vol. 37, No. 11, pp. 48-58, Greg Regnier, et al., Nov. 2004.
Declaration of Dr Gregory L Chesson in *Alacritech* v. *Microsoft*, United States District Court, Northern District California, San Francisco Division, Gregory L. Chesson, Feb. 4, 2005.
Computing Research: A Looming Crisis, ACM Computer Communication Review, vol. 35, No. 2, Edward D. Lazowska and David A. Patterson, Jul. 2005.
Performance Characterization of a 10-Gigabit Ethernet TOE, Proceedings of the 13th Symposium on High Performance Interconnects, W. Feng, et al., Aug. 17, 2005.
User-level device drivers: Achieved performance, J. Comput. Sci. & Technol., vol. 20, B. Leslie, et al., Sep. 2005.
Head-to-TOE Evaluation of High-Performance Sockets Over Protocol Offload Engines, Proceedings of the IEEE International Conference on Cluster Computing, P. Balaji, et al., Sep. 2005.
SCTP versus TCP for MPI, Proceedings of the 2005 ACM/IEEE conference on Supercomputing, Seattle, p. 30, Washington, Humaira Kamal, et al., Nov. 12, 2005.
LTCP: Improving the Performance of TCP in Highspeed Networks, ACM Computer Communication Review, vol. 36, No. 1, pp. 41-50, Sumitha Bhandarkar, et al., Jan. 2006.
Zero-Copy TCP in Solaris, Proceedings of the USENIX Annual Technical Conference, H. K. Jerry Chu, Jan. 1996.
Reflections on Network Architecture: an Active Networking Perspective, ACM Computer Communication Review, vol. 36, No. 2, pp. 27-30, Ken Calvert, Apr. 2006.
10 Networking Papers: Recommended Reading, ACM Computer Communication Review, vol. 36, No. 2, pp. 51-52, Jon Crowcroft, Apr. 2006.
Flow labelled IP over ATM: design and rationale, ACM Computer Communication Review, vol. 36, No. 3, pp. 79-92, Greg Minshall, et al., Jul. 2006.
10 Networking Papers: Readings for Protocol Design, ACM Computer Communication Review, vol. 36, No. 3, pp. 77-78, David Wetherall, Jul. 2006.
A Critique of RDMA, HPCWire article: http://www.hpcwire.com/features/17886984.html,Patrick Geoffray, Aug. 18, 2006.
The NE010 iWARP Adapter, Open Fabrics Alliance, Gary Montry, May 2006.
Protocol Onload vs. Offload, Intel, Greg Regnier, Date Unknown.
Protocol Onloading vs. Offloading in High Performance Networks, Pacific Northwest Laboratories by Batelle for the U.S. Department of Energy, Fabrizio Petrini, Date Unknown.
Thoughts about TCP Offloading, My 2003 HotOS paper title: TCP Offload is a dumb idea whose time has to come, HP Labs (Not speaking for HP), Jeff Mogul, Aug. 2006.
Protocol Offloading vs. Onloading in High Performance Networks, Hot Interconnect Panel, System Interconnect Group, Qlogic Corporation, Lloyd Dickman CTO, Aug. 23, 2006.
Protocol off-loading vs. on-loading in high performance networks, Hot Interconnects, Myricom®, Patrick Geoffray, 2006.
Quantifying the Potential Benefit of Overlapping Communication and Computation in Large-Scale Scientific Applications, Proceedings of the 2006 ACM/IEEE conference on Supercomputing, Tampa, Florida, Jose Carlos Sancho, et al., Nov. 11, 2006.
High-Performance and Scalable MPI over InfiniBand with Reduced Memory Usage: An In-Depth Performance Analysis, Proceedings of the 2006 ACM/IEEE conference on Supercomputing, Tampa, Florida, Sayantan Sur, et al., Nov. 11, 2006.
10Gb/s Ethernet Performance and Retrospective, ACM Computer Communication Review, vol. 37, No. 2, pp. 89-92, Steven Pope and David Riddoch, Apr. 2007.
Getting 10 Gb/s from Xen, Euro-Par Conference 2007, pp. 224-233, Rennes, France, Kieran Mansley, et al., Aug. 28, 2007.
The Parallel Protocol Engine, IEEE/ACM Transactions in Networking vol. 1, Issue 6, pp. 650-663, M. Kaiserswerth, Dec. 1993.
Use of message-based multicomputer components to construct gigabit networks, ACM Computer Communication Review, vol. 23, No. 4, p. 32-44, Danny Cohen, et al., Jul. 1993.
The End of History, IEEE TCGN Gigabit Networking Workshop, J. Evans and T. Buller, Apr. 22, 2001.
The Cambridge Model Distributed System, ACM SIGOPS Operating Systems Review, vol. 14, Issue 1, pp. 21-29, M.V. Wilkes and R.M. Needham, Jan. 1980.
The Aloha System, ACM Computer Communication Review, vol. 4 No. 1, F.F. Kuo, Jan. 1974.
A Protocol for Packet Network Intercommunication, IEEE Transactions on Communications, vol. COM-22, No. 5, pp. 637-648, Vinton Cerf, Robert Kahn, May 1974.

\* cited by examiner

CHECKING DATA INTEGRITY

PRIOR APPLICATION DATA

This application is a continuation of and claims priority to U.S. patent application Ser. No. 11/584,263 filed Oct. 19, 2006 which claims priority to and the benefit of PCT Application No. PCT/GB2005/001376, entitled Checking Data Integrity which was published as WO 2005/104479 and which is entitled to a priority date of Apr. 21, 2004.

FIELD OF THE INVENTION

This invention relates to a network interface, for example an interface device for linking a computer to a network.

SUMMARY

To overcome the drawbacks of the prior art and provide additional benefits, a method and apparatus is disclosed herein for packet processing. In one embodiment a network interface device is disclosed that is configured to connect to a data processing device and to a data network to provide an interface between the data processing device and the network for supporting the network of packets of a transport protocol. The network interface device is configured to identify, within the payloads of such packets, data of a further protocol. In this configuration the data of the further protocol comprises payload data of the further protocol and framing data of the further protocol, and the framing data including verification data for permitting the integrity of the payload data to be verified. Upon so identifying data of the further protocol, the device processes at least the payload data for determining the integrity thereof and transmits, to the data processing device, at least some of the framing data and an indication of the result of the said processing.

In one embodiment, the network interface device is configured to process the payload data by applying a predetermined function to the payload data to form a verification result. It is also contemplated that the verification result may be the indication of the result. Moreover, the network interface device may be configured to transmit, to the data processing device, the payload data together with at least some of the framing data. The network interface device may be further configured to process the payload data by comparing the verification result with the verification data and the result of that comparison is the indication of the result. In addition, the network interface device may be configured to, if the result of that comparison is that the verification result matches the verification data, transmit to the data processing device the payload data together with at least some of the framing data.

It is further contemplated that the network interface device may be configured to, if the result of that comparison is that the verification result does not match the verification data, not transmit, to the data processing device, the payload data. In one configuration the predetermined function is a cyclic redundancy check function or an authentication function. In one embodiment the predetermined function is a function that involves byte-by-byte processing of the payload data. Likewise, the packets of the transport protocol comprise packet headers of that protocol and the network interface device is configured to, on identifying data of the further protocol, transmit to the data processing device at least some of the header(s) of the packet(s) of the transport protocol that carried that the payload data together with the payload data.

As will be understood, the network interface device may be configured to perform the transmission to the data processing device by transmitting data to a transport library supported by the data processing device. In addition, the transport protocol may comprise the TCP (transmission control protocol) protocol. In one embodiment the further protocol is a protocol for remote direct memory access or the RDMA (remote direct memory access) or ISCSI (internet small computer serial interface) protocol. The further protocol may supports memory write instructions such that the framing data includes information indicative of a memory address of the data processing device to which at least some of the payload data is to be written.

In one embodiment the network interface device is configured to, upon identifying at least some forms of data of the further protocol, raise an interrupt on the data processing apparatus. The forms of data may include memory read instructions or memory write instructions. In one embodiment the read write instructions include information indicative of a memory address at which the read/write is to be performed.

Also disclosed herein is a data processing system comprising a data processing device and a network interface device for connection to the data processing device and to a data network. This configuration provides an interface between the data processing device and the network for supporting the network of packets of a transport protocol such that the network interface device is configured to identify within the payloads of such packets data of a further protocol. Thus, the data of the further protocol may comprise payload data of the further protocol and framing data of the further protocol, and the framing data may include verification data for permitting the integrity of the payload data to be verified. Upon so identifying data of the further protocol this system may process at least the payload data for determining the integrity thereof and then transmit to the data processing device at least some of the framing data with an indication of the result of the processing.

Also disclosed herein is a method for processing data by means of a network interface device which also connects to a data processing device and to a data network so as to provide an interface between the data processing device and the network. This method supports the network of packets of a transport protocol. In one embodiment the method comprising performing the following steps by means of the network interface device by identifying, within the payloads of such packets, data of a further protocol. The data of the further protocol may comprise payload data of the further protocol and framing data of the further protocol such that the framing data includes verification data for permitting the integrity of the payload data to be verified. This method also, upon so identifying data of the further protocol, processes at least the payload data to determine the integrity thereof and then transmits to the data processing device at least some of the framing data and an indication of the result of the processing.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

The present invention will now be described by way of example with reference to the accompanying drawings, in which.

DETAILED DESCRIPTION

Figure 1:
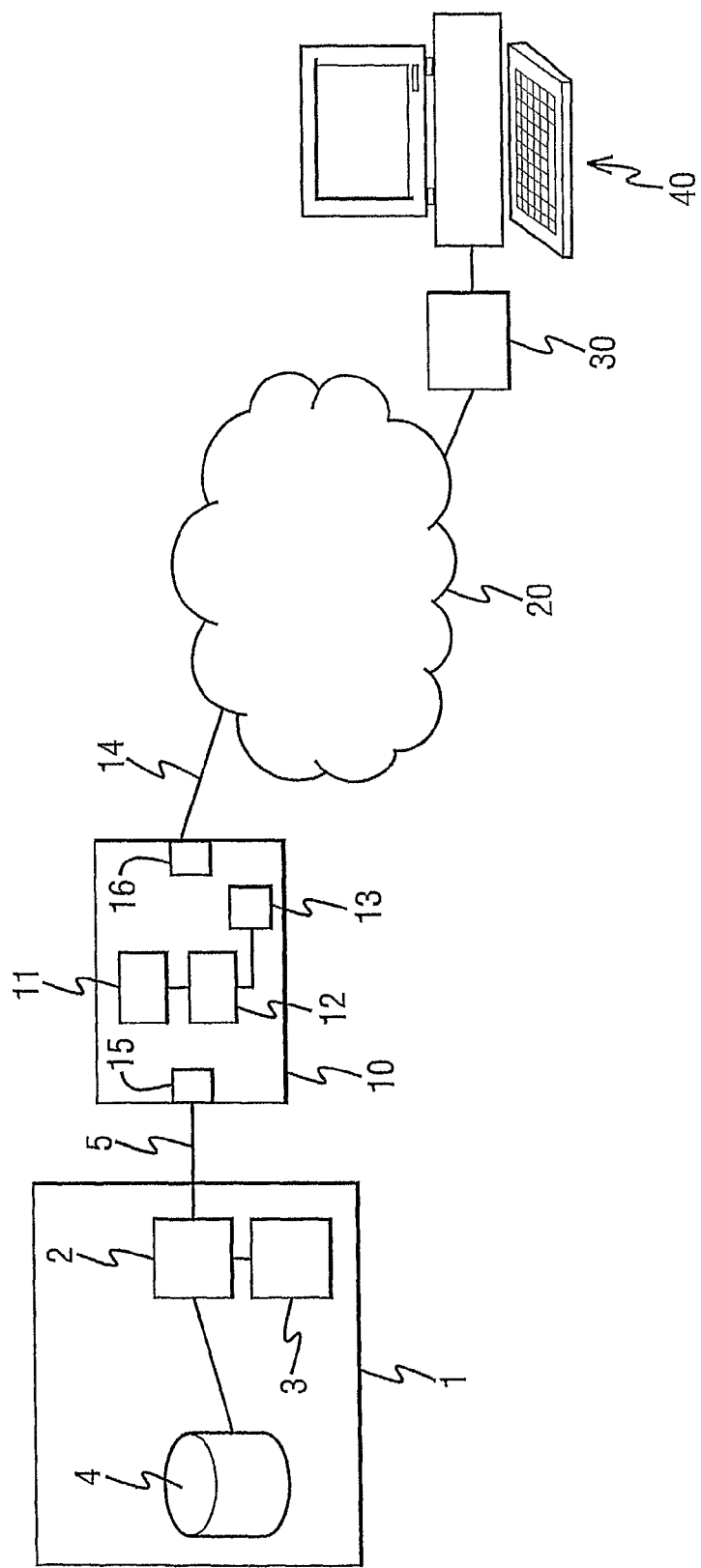
FIG. 1 is a schematic diagram of a network interface device in use.

FIG. 1 is a schematic diagram showing a network interface device such as a network interface card (NIC) and the general architecture of the system in which it may be used. The network interface device 10 is connected via a data link 5 to a processing device such as computer 1, and via a data link 14 to a data network 20. Further network interface devices such as processing device 30 are also connected to the network, providing interfaces between the network and further processing devices such as processing device 40.

The computer 1 may, for example, be a personal computer, a server or a dedicated processing device such as a data logger or controller. In this example it comprises a processor 2, a program store 4 and a memory 3. The program store stores instructions defining an operating system and applications that can run on that operating system. The operating system provides means such as drivers and interface libraries by means of which applications can access peripheral hardware devices connected to the computer.

It is desirable for the network interface device to be capable of supporting standard transport protocols such as TCP, RDMA and ISCSI at user level: i.e. in such a way that they can be made accessible to an application program running on computer 1. Such support enables data transfers which require use of standard protocols to be made without requiring data to traverse the kernel stack. In the network interface device of this example standard transport protocols are implemented within transport libraries accessible to the operating system of the computer 1.

Figure 2:
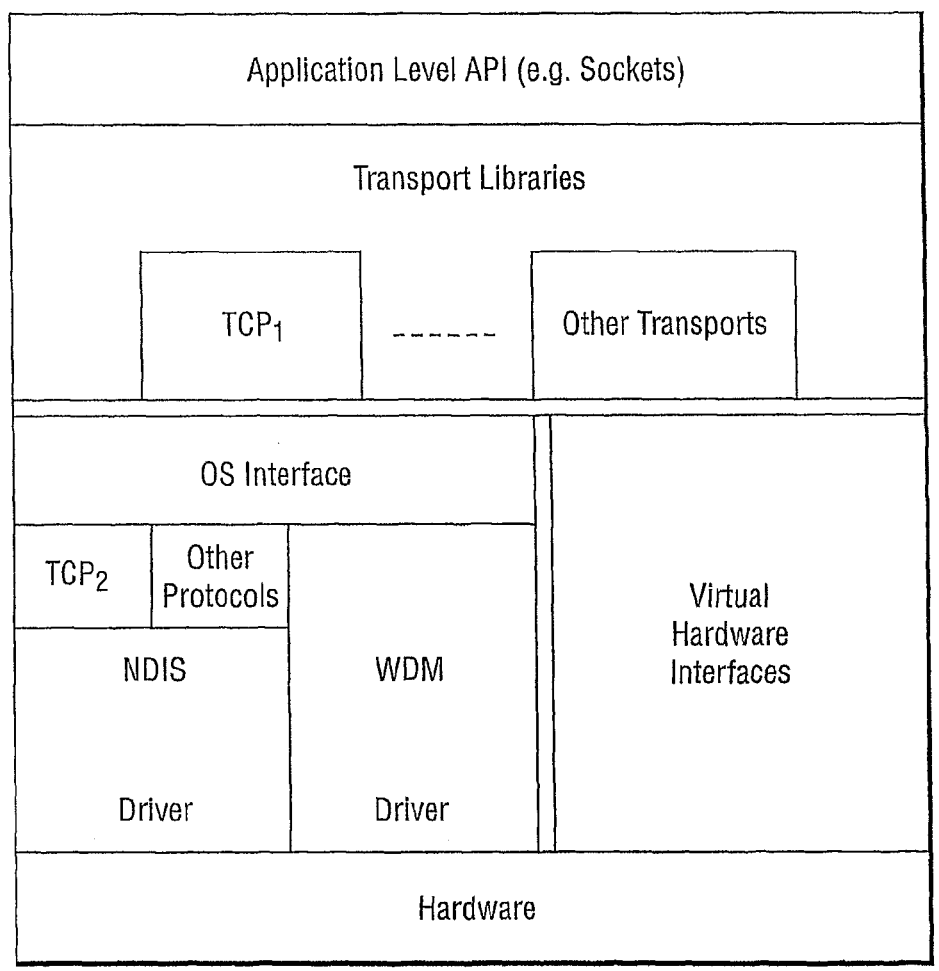
FIG. 2 illustrates an implementation of a transport library architecture.

FIG. 2 illustrates one implementation of this. In this architecture the TCP (and other) protocols are implemented twice: as denoted TCP1 and TCP2 in FIG. 2. In a typical operating system TCP2 will be the standard implementation of the TCP protocol that is built into the operating system of the computer. In order to control and/or communicate with the network interface device an application running on the computer may issue API (application programming interface) calls. Some API calls may be handled by the transport libraries that have been provided to support the network interface device. API calls which cannot be serviced by the transport libraries that are available directly to the application can typically be passed on through the interface between the application and the operating system to be handled by the libraries that are available to the operating system. For implementation with many operating systems it is convenient for the transport libraries to use existing Ethernet/IP based control-plane structures: e.g. SNMP and ARP protocols via the OS interface.

There are a number of difficulties in implementing transport protocols at user level. Most implementations to date have been based on porting pre-existing kernel code bases to user level. Examples of these are Arsenic and Jet-stream. These have demonstrated the potential of user-level transports, but have not addressed a number of the problems required to achieve a complete, robust, high-performance commercially viable implementation.

Figure 3:
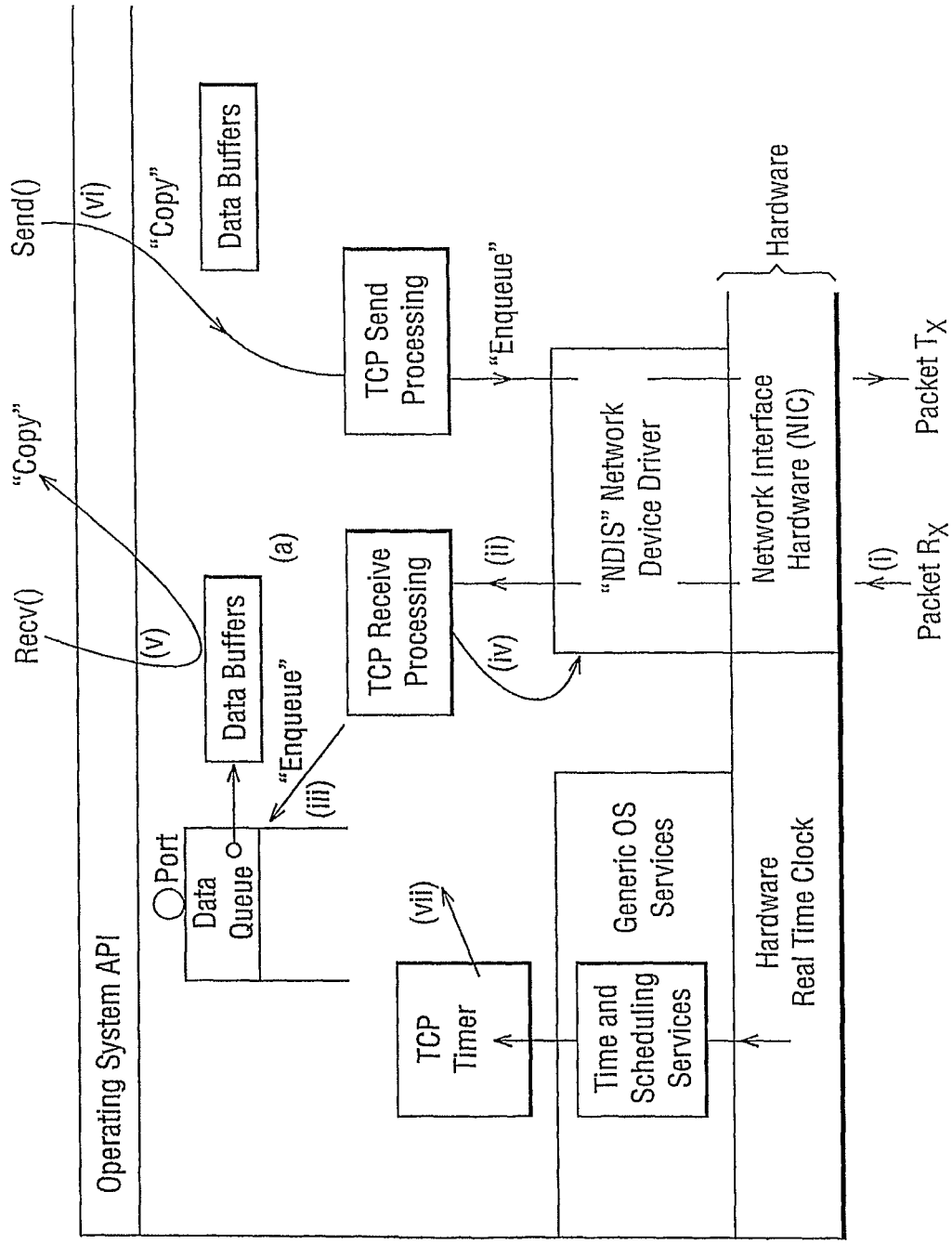
FIG. 3 shows an architecture employing a standard kernel TCP transport with a user level TCP transport.

FIG. 3 shows an architecture employing a standard kernel TCP transport (TCPk).

The operation of this architecture is as follows.

On packet reception from the network interface hardware (e.g. a network interface card (NIC)), the NIC transfers data into pre-allocated data buffer (a) and invokes the OS interrupt handler by means of the interrupt line. (Step i). The interrupt handler manages the hardware interface e.g. posts new receive buffers and passes the received (in this case Ethernet) packet looking for protocol information. If a packet is identified as destined for a valid protocol e.g. TCP/IP it is passed (not copied) to the appropriate receive protocol processing block. (Step ii).

TCP receive-side processing takes place and the destination part is identified from the packet. If the packet contains valid data for the port then the packet is engaged on the port's data queue (step iii) and that port marked (which may involve the scheduler and the awakening of blocked process) as holding valid data.

The TCP receive processing may require other packets to be transmitted (step iv), for example in the cases that previously transmitted data should be retransmitted or that previously enqueued data (perhaps because the TCP window has opened) can now be transmitted. In this case packets are enqueued with the OS "NDIS" driver for transmission.

In order for an application to retrieve a data buffer it must invoke the OS API (step v), for example by means of a call such as recv( ) select( ) or poll( ). This has the effect of informing the application that data has been received and (in the case of a recv( ) call) copying the data from the kernel buffer to the application's buffer. The copy enables the kernel (OS) to reuse its network buffers, which have special attributes such as being DMA accessible and means that the application does not necessarily have to handle data in units provided by the network, or that the application needs to know a priori the final destination of the data, or that the application must pre-allocate buffers which can then be used for data reception.

It should be noted that on the receive side there are at least two distinct threads of control which interact asynchronously: the up-call from the interrupt and the system call from the application. Many operating systems will also split the up-call to avoid executing too much code at interrupt priority, for example by means of "soft interrupt" or "deferred procedure call" techniques.

The send process behaves similarly except that there is usually one path of execution. The application calls the operating system API (e.g. using a send 0 call) with data to be transmitted (Step vi). This call copies data into a kernel data buffer and invokes TCP send processing. Here protocol is applied and fully formed TCP/IP packets are enqueued with the interface driver for transmission.

If successful, the system call returns with an indication of the data scheduled (by the hardware) for transmission. However there are a number of circumstances where data does not become enqueued by the network interface device. For example the transport protocol may queue pending acknowledgements or window updates, and the device driver may queue in software pending data transmission requests to the hardware.

A third flow of control through the system is generated by actions which must be performed on the passing of time. One example is the triggering of retransmission algorithms. Generally the operating system provides all OS modules with time and scheduling services (driven by the hardware clock interrupt), which enable the TCP stack to implement timers on a per-connection basis.

Figure 4:
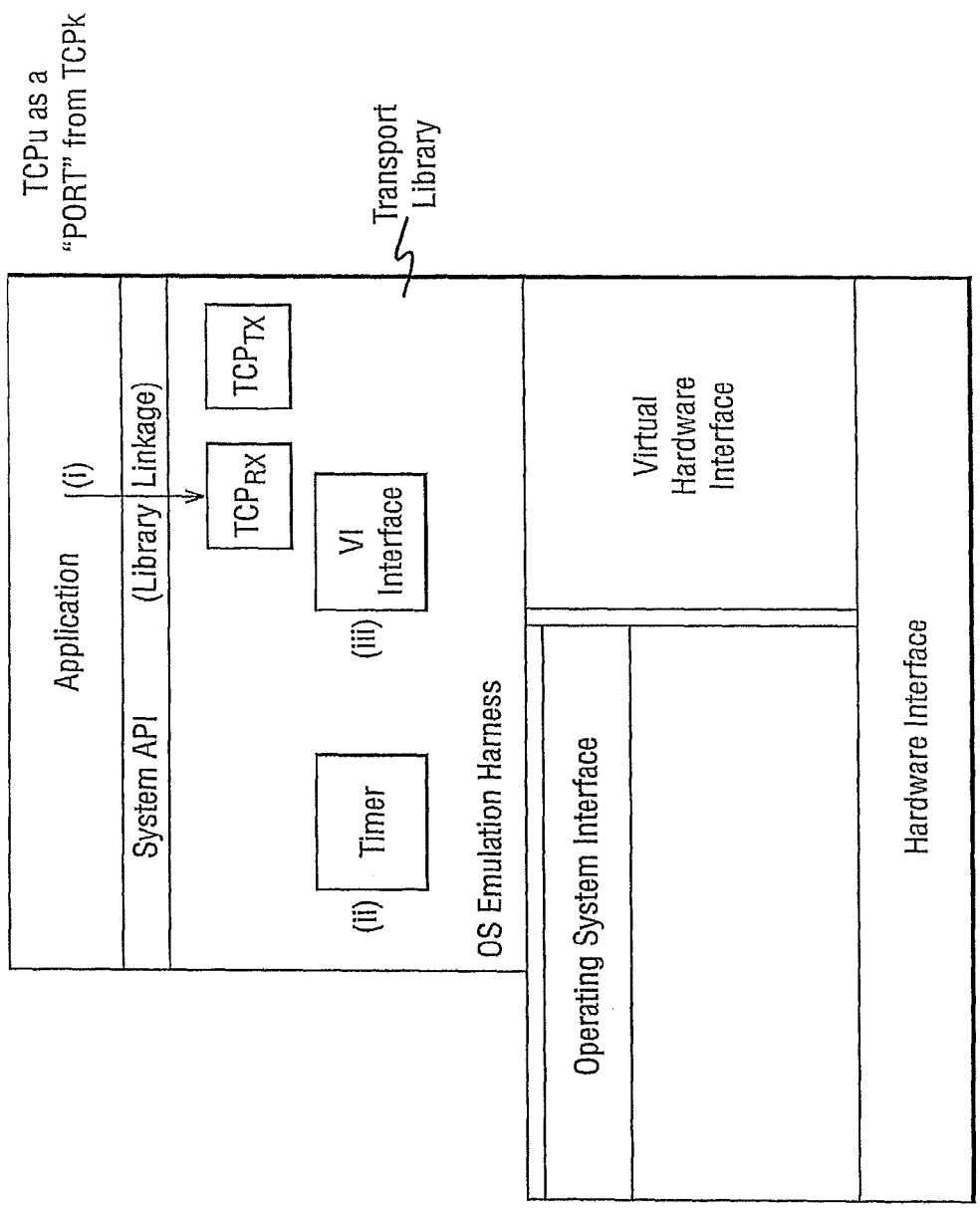
FIG. 4 illustrates an architecture in which a standard kernel stack is implemented at user-level.

If a standard kernel stack were implemented at user-level then the structure might be generally as shown in FIG. 4. The application is linked with the transport library, rather than directly with the OS interface. The structure is very similar to the kernel stack implementation with services such as timer support provided by user level packages, and the device driver interface replaced with user-level virtual interface module. However in order to provide the model of a asynchronous processing required by the TCP implementation there must be a number of active threads of execution within the transport library:

(i) System API calls provided by the application
(ii) Timer generated calls into protocol code
(iii) Management of the virtual network interface and resultant upcalls into protocol code. (ii and iii can be combined for some architectures)

However, this arrangement introduces a number of problems:

(a) The overheads of context switching between these threads and implementing locking to protect shared-data structures can be significant, costing a significant amount of processing time.

(b) The user level timer code generally operates by using operating system provided timer/time support. Large overheads caused by system calls from the timer module result in the system failing to satisfy the aim of preventing interaction between the operating system and the data path.

(c) There may be a number of independent applications each of which manages a sub-set of the network connection; some via their own transport libraries and some by existing kernel stack transport libraries. The NIC must be able to efficiently parse packets and deliver them to the appropriate virtual interface (or the OS) based on protocol information such as IP port and host address bits.

(d) It is possible for an application to pass control of a particular network connection to another application for example during a fork( ) system call on a Unix operating system. This requires that a completely different transport library instance would be required to access connection state. Worse, a number of applications may share a network connection which would mean transport libraries sharing ownership via (inter process communication) techniques. Existing transports at user level do not attempt to support this.

(e) It is common for transport protocols to mandate that a network connection outlives the application to which it is tethered. For example using the TCP protocol, the transport must endeavour to deliver sent, but unacknowledged data and gracefully close a connection when a sending application exits or crashes. This is not a problem with a kernel stack implementation that is able to provide the "timer" input to the protocol stack no matter what the state (or existence) of the application, but is an issue for a transport library which will disappear (possibly ungracefully) if the application exits, crashes, or stopped in a debugger.

Furthermore, RDMA (remote direct memory access) and ISCSI (internet small computer system interface) are protocols that allow one device such as a computer to directly access the contents of the memory of another ("target") device to which it is connected over a network. The protocols involve embedding in conventional network packets strings of data that define the operations to be performed according to the protocol. For example, to perform an RDMA operation to write data to the memory of a remote computer a TCP packet may be sent to that computer with a payload containing string made up of: a marker marking the start of RDMA data, a tag indicating where in the memory the data is to be written to, the data itself, and a CRC block to allow the integrity of the data to be verified on receipt. A single TCP packet may contain multiple such strings. When the TCP packet is received the data in its payload can be identified as RDMA data and processed accordingly to perform the desired write operation.

The processing of the packet to extract, verify and interpret the RDMA data can be performed by a processor of the target device itself or by a network interface device of the target device. However, it is conventional for the processing to be performed by the network interface device because this allows the passing of the data to and from the memory of the target to be performed efficiently. If the processing were performed by a processor of the target device then two memory write operations would be required since the RDMA data string would first have to be passed to a buffer area of the device's memory for processing, and then—when the destination address of the data had been determined—it would be copied to that address. In contrast, if the RDMA processing is performed on the network interface device then the destination address can be determined there and the data can be written directly to that address, saving the copy operation that would otherwise be required. For this reason the approach of processing RDMA or ISCSI data on the network interface device is preferred. However, it has the disadvantage that it requires the network interface device to have considerable processing power. This increases expense, especially since embedded processing power on devices such as network interface devices is typically more expensive than main processor power.

It would be desirable to provide an enhanced means of supporting protocols such as RDMA and ISCSI.

According to one aspect of the present invention there is provided a network interface device for connection to a data processing device and to a data network so as to provide an interface between the data processing device and the network for supporting the network of packets of a transport protocol, the network interface device being configured to identify within the payloads of such packets data of a further protocol, the data of the further protocol comprising payload data of the further protocol and framing data of the further protocol, and the framing data including verification data for permitting the integrity of the payload data to be verified; on so identifying data of the further protocol, process at least the payload data for determining the integrity thereof and transmit to the data processing device at least some of the framing data and an indication of the result of the said processing.

Further aspects and preferred features of the present invention are set out in the claims.

Figure 5:
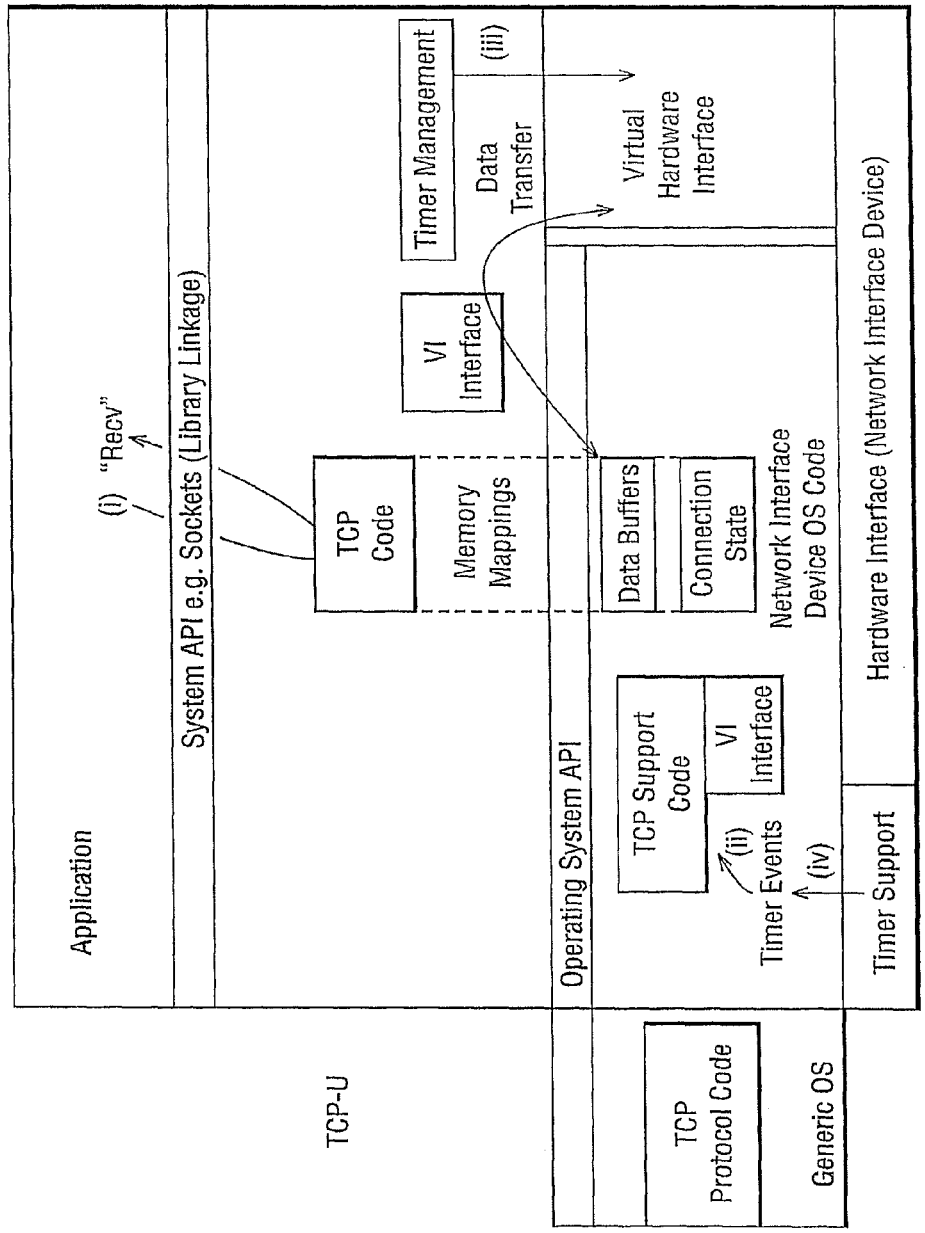
FIG. 5 shows an example of a TCP transport architecture.

FIG. 5 shows an example of a TCP transport architecture suitable for providing an interface between a network interface device such as device 10 of FIG. 1 and a computer such as computer 1 of FIG. 1. The architecture is not limited to this implementation.

The principal differences between the architecture of the example of FIG. 5 and conventional architectures are as follows.

(i) TCP code which performs protocol processing on behalf of a network connection is located both in the transport library, and in the OS kernel. The fact that this code performs protocol processing is especially significant.

(ii) Connection state and data buffers are held in kernel memory and memory mapped into the transport library's address space.

(iii) Both kernel and transport library code may access the virtual hardware interface for and on behalf of a particular network connection.

(iv) Timers may be managed through the virtual hardware interface, (these correspond to real timers on the network interface device) without requiring system calls to set and clear them. The NIC generates timer events which are received by the network interface device driver and passed up to the TCP support code for the device.

It should be noted that the TCP support code for the network interface device is in addition to the generic OS TCP implementation. This is suitably able to co-exist with the stack of the network interface device.

The effects of this architecture are as follows.

(a) Requirement for Multiple Threads Active in the Transport Library

This requirement is not present for the architecture of FIG. 5 since TCP code can either be executed in the transport library as a result of a system API call (e.g. recv( ) (see step i of FIG. 5) or by the kernel as a result of a timer event (see step ii of FIG. 5). In ether case, the VI (virtual interface) can be managed and both code paths may access connection state or data buffers, whose protection and mutual exclusion may be managed by shared memory locks. As well as allowing the overheads of thread switching at the transport library level to be removed, this feature can prevent the requirement for applications to change their thread and signal-handling assumptions: for example in some situations it can be unacceptable to require a single threaded application to link with a multi-threaded library.

(b) Replacement to Issue System Calls for Timer Management

This requirement is not present for the architecture of FIG. 5 because the network interface device can implement a number of timers which may be allocated to particular virtual interface instances: for example there may be one timer per active TCP transport library. These timers can be made programmable (see step iii of FIG. 5) through a memory mapped VI and result in events (see step iv of FIG. 5) being issued. Because timers can be set and cleared without a system call the overhead for timer management is greatly reduced.

(c) Correct Delivery of Packets to Multiple Transport Libraries

The network interface device can contain or have access to content addressable memory, which can match bits taken from the headers of incoming packets as a parallel hardware match operation. The results of the match can be taken to indicate the destination virtual interface which must be used for delivery, and the hardware can proceed to deliver the packet onto buffers which have been pushed on the VI. One possible arrangement for the matching process is described below. The arrangement described below could be extended to de-multiplex the larger host addresses associated with IPv6, although this would require a wider CAM or multiple CAM lookups per packet than the arrangement as described.

One alternative to using a CAM for this purpose is to use a hash algorithm that allows data from the packets' headers to be processed to determine the virtual interface to be used.

(d) Handover of Connections Between Processes/Applications/Threads

When a network connection is handed over the same system-wide resource handle can be passed between the applications. This could, for example, be a file descriptor. The architecture of the network interface device can attach all state associated with the network connection with that (e.g.) file descriptor and require the transport library to memory map on to this state. Following a handover of a network connection, the new application (whether as an application, thread or process)—even if it is executing within a different address space—is able to memory-map and continue to use the state. Further, by means of the same backing primitive as used between the kernel and transport library any number of applications are able to share use of a network connection with the same semantics as specified by standard system APIs.

(e) Completion of Transport Protocol Operations when the Transport Library is Ether Stopped or Killed or Quit.

This step can be achieved in the architecture of the network interface device because connection state and protocol code can remain kernel resident. The OS kernel code can be informed of the change of state of an application in the same manner as the generic TCP (TCPk) protocol stack. An application which is stopped will then not provide a thread to advance protocol execution, but the protocol will continue via timer events, for example as is known for prior art kernel stack protocols.

As discussed above, there are a number of newly emerging protocols such as IETF RDMA and iSCSI. At least some of these protocols were designed to run in an environment where the TCP and other protocol code executes on the network interface device. Facilities will now be described whereby the processing to support such protocols can be executed at least partially on a host CPU (i.e. using the processing means of a computer to which a network interface card is connected). Such an implementation is advantageous because it allows a user to take advantage of the price/performance lead of main CPU technology as against co-processors.

Protocols such as RDMA involve the embedding of framing information and cyclic redundancy check (CRC) data within the TCP stream. While framing information is trivial to calculate within protocol libraries, CRC's (in contrast to checksums) are computationally intensive and best done by hardware. To accommodate this, when a TCP stream is carrying an RDMA or similar encapsulation, an option in the virtual interface can be enabled, for example by means of a flag. On detecting this option, the NIC will parse each packet on transmission, recover the RDMA frame, apply the RDMA CRC algorithm and insert the CRC on the fly during transmission. Analogous procedures can beneficially be used in relation to other protocols, such as iSCSI, that require computationally relatively intensive calculation of error check data.

In line with this system the network interface device can also verify CRCs on received packets using similar logic. This may, for example, be performed in a manner akin to the standard TCP checksum off-load technique.

To execute this arrangement, the steps performed are preferably as follows. When operating in an RDMA compatible mode the NIC analyses the payload of each received TCP packet to identify whether it comprises RDMA data. This may be done by checking whether the RDMA framing data (i.e. the RDMA header and footer) and particularly the RDMA header marker is present in the payload. If it is not present then the packet is processed as normal. If it is present then the payload of the packet is processed by the NIC according to the RDMA CRC algorithm in order to calculate the RDMA CRC for the received data. Once that has been calculated then one of two routes can be employed. In a first route the RDMA data together with the calculated CRC is passed to the host computer. The host computer can then compare the calculated CRC with the CRC as received in the RDMA data to establish whether the data has been correctly received. Alternatively, in a second route that comparison can be performed at the NIC and the RDMA data together with an indication of the result of that comparison (e.g. in a one-bit flag) is passed to the host computer. In either case the host computer can then process the RDMA data accordingly. Thus, if the result of the CRC check indicates that data has been correctly received it can execute the RDMA command represented by the data (typically a read or write command). Otherwise it does not execute the command, and in that case it may automatically perform an error recovery action such as initiating a request for retransmission of the data.

If the NIC performs the checking of the CRC in addition to its calculation then if it determines that the data has not been validly received it need not transmit the payload of the corresponding RDMA data to the host computer. It need only transmit sufficient information from the header of the transport protocol packet (typically a TCP header) and from the RDMA framing information to allow the host computer to request retransmission. It may transmit the whole of that header and framing information or it could transmit just some of that header and framing information. It will be appreciated that this operation is performed on a per-RDMA-data-unit basis. Thus, if a TCP packet contains a single RDMA data unit it is the framing data of that same data unit and the header of that same packet (or part thereof) that are passed to the host computer. If a TCP packet contains multiple RDMA data units then if any RDMA data unit is determined to be bad then its framing data and the header of the entire packet (or part thereof) are transmitted to the host PC.

Protocols such as RDMA also mandate additional operations such as RDMA READ which in conventional implementations require additional intelligence on the network interface device. As indicated above, this type of implementation has led to the general belief that RDMA/TCP should best be implemented by means of a co-processor network interface device. In an architecture of the type described herein, specific hardware filters can be encoded to trap such upper level protocol requests for a particular network connection. In such a circumstance, the NIC can generate an event akin to the timer event in order to request action by software running on the attached computer, as well a delivery data message. By triggering an event in such a way the NIC can achieve the result that either the transport library, or the kernel helper will act on the request immediately. This can avoid the potential problem of kernel extensions not executing until the transport library is scheduled and can be applied to other upper protocols if required.

The calculation of the CRC is preferably performed by dedicated hardware of the NIC, since this provides a particularly efficient way of carrying out such bit-by-bit operations. Similarly, the above method could be applied to calculations other than CRC calculations—which may for example include authentication, encryption and decryption operations.

Whilst this example has been described with reference to RDMA, it could be applied to other protocols.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A data processing system comprising:
a data processing device configured to perform transport protocol processing; and
a network interface device connected to the data processing device and configured to on receiving a data packet of the transport protocol:
identify within a payload of the data packet data of a further protocol, the data of the further protocol comprising payload data of the further protocol and framing data of the further protocol, the framing data of the further protocol including verification data for permitting the integrity of the payload data of the further protocol to be verified;
upon identifying the data of the further protocol, process the payload data of the further protocol so as to determine the integrity thereof; and
if the payload data of the further protocol is determined by said processing not to have integrity, then transmit to the data processing device header data of the data packet of the transport protocol and at least some of the framing data of the further protocol but not the payload data of the further protocol; and
otherwise, transmit to the data processing device the header data of the data packet of the transport protocol, the payload data of the further protocol and at least some of the framing data of the further protocol;
wherein the data processing device is further configured to:
on receiving the header data of the data packet of the transport protocol and at least some of the framing data of the further protocol but not the payload data of the further protocol, initiate a request for retransmission of the payload data of the further protocol; and
on receiving the header data of the data packet of the transport protocol, payload data of the further protocol and at least some of the framing data of the further protocol, process the payload and framing data of the further protocol and at least partially protocol process the header data of the data packet of the transport protocol.

2. A data processing system as claimed in claim 1, wherein the network interface device is configured to process the payload data of the further protocol by applying a data verification algorithm to the payload data of the further protocol to form a verification result.

3. A data processing system as claimed in claim 2, wherein the network interface device is configured to transmit the verification result to the data processing device with the at least some of the framing data of the further protocol.

4. A data processing system as claimed in claim 1, wherein the network interface device is configured to transmit header data of the data packet of the transport protocol to the data processing device with the at least some of the framing data of the further protocol.

5. A data processing system as claimed in claim 2, wherein the data verification algorithm is a cyclic redundancy check function.

6. A data processing system as claimed in claim 2, wherein the data verification algorithm is an authentication function.

7. A data processing system as claimed in claim 1, wherein the network interface device is configured to perform the transmission to the data processing device by transmitting data to a transport library supported by the data processing device.

8. A data processing system as claimed in claim 1, wherein the transport protocol is the TCP (transmission control protocol) protocol.

9. A data processing system as claimed in claim 1, wherein the further protocol is a protocol for remote direct memory access.

10. A data processing system as claimed in claim 9, wherein the further protocol is such that it supports memory write instructions and the framing data of the further protocol includes information indicative of a memory address of the data processing device to which at least some of the payload data is intended to be written.

11. A data processing system as claimed in claim 10, wherein the further protocol is the RDMA (remote direct memory access) or iSCSI (internet small computer serial interface) protocol.

12. A data processing system as claimed in claim 1, wherein the network interface device is configured to provide an interface between the data processing device and a network.

13. A method for processing a data packet received over a network at a data processing system having a data processing device configured to perform transport protocol processing and a network interface device, the method comprising:
  the network interface device, on receiving a data packet formed in accordance with a transport protocol:
  identifying within a payload of the data packet data of a further protocol, the data of the further protocol comprising payload data of the further protocol and framing data of the further protocol, the framing data of the further protocol including verification data for permitting the integrity of the payload data to be verified;
  upon identifying the data of the further protocol, processing the payload data of the further protocol so as to determine the integrity thereof; and
  if the payload data of the further protocol is determined by said processing not to have integrity, then transmitting to the data processing device header data of the data packet of the transport protocol and at least some of the framing data of the further protocol but not the payload data of the further protocol; and
  otherwise, transmitting to the data processing device the header data of the data packet of the transport protocol, the payload data of the further protocol and at least some of the framing data of the further protocol;
    on receiving the header data of the data packet of the transport protocol and at least some of the framing data of the further protocol but not the payload data of the further protocol, initiate a request for retransmission of the payload data of the further protocol; and
    on receiving the header data of the data packet of the transport protocol, payload data of the further protocol and at least some of the framing data of the further protocol, process the payload and framing data of the further protocol and at least partially protocol process the header data of the data packet of the transport protocol.

14. A method as claimed in claim 13, wherein the network interface device is located between the data processing device and a network.

* * * * *